(12) United States Patent
Yasutake et al.

(10) Patent No.: US 12,114,410 B2
(45) Date of Patent: Oct. 8, 2024

(54) HEATING COIL AND HEATING METHOD

(71) Applicant: NETUREN CO., LTD., Tokyo (JP)

(72) Inventors: Hidehiro Yasutake, Tokyo (JP); Takashi Horino, Tokyo (JP); Hiroki Inoue, Tokyo (JP); Hiroaki Kinoshita, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 787 days.

(21) Appl. No.: 17/270,685

(22) PCT Filed: Aug. 21, 2019

(86) PCT No.: PCT/JP2019/032680
§ 371 (c)(1),
(2) Date: Feb. 23, 2021

(87) PCT Pub. No.: WO2020/040214
PCT Pub. Date: Feb. 27, 2020

(65) Prior Publication Data
US 2021/0321495 A1     Oct. 14, 2021

(30) Foreign Application Priority Data

Aug. 23, 2018  (JP) ................. 2018-156671

(51) Int. Cl.
*H05B 6/10* (2006.01)
*H05B 6/40* (2006.01)
*H05B 6/44* (2006.01)

(52) U.S. Cl.
CPC ............. *H05B 6/102* (2013.01); *H05B 6/104* (2013.01); *H05B 6/40* (2013.01); *H05B 6/44* (2013.01)

(58) Field of Classification Search
CPC . H05B 6/104; H05B 6/40; H05B 6/44; H05B 6/102
See application file for complete search history.

(56) References Cited

U.S. PATENT DOCUMENTS

| 4,749,834 A | 6/1988 | Mucha et al. |
| 2007/0000916 A1 | 1/2007 | Tanaka et al. |

FOREIGN PATENT DOCUMENTS

| JP | 2010-27313 | | 2/2010 |
| JP | 2011-32535 | | 2/2011 |
| JP | 2011032535 A | * | 2/2011 |
| JP | 5578465 | | 8/2014 |

OTHER PUBLICATIONS

International Search Report and Written Opinion of the International Searching Authority, issued in corresponding International Patent Application No. PCT/JP2019/032680 on Nov. 7, 2019.
Notice to Submit Response issued Apr. 14, 2023 in corresponding Korean Patent Application No. 10-2021-7005305, with English language translation.

* cited by examiner

*Primary Examiner* — Thien S Tran
(74) *Attorney, Agent, or Firm* — Wenderoth, Lind & Ponack, L.L.P.

(57) ABSTRACT

A heating coil includes a plurality of loop portions disposed coaxially along an axis, a first lead portion and a second lead portion which electrically connect to a power source, and a connection portion which connects the plurality of loop portions, the first lead portion, and the second lead portion in series.

6 Claims, 13 Drawing Sheets

[Fig. 1]
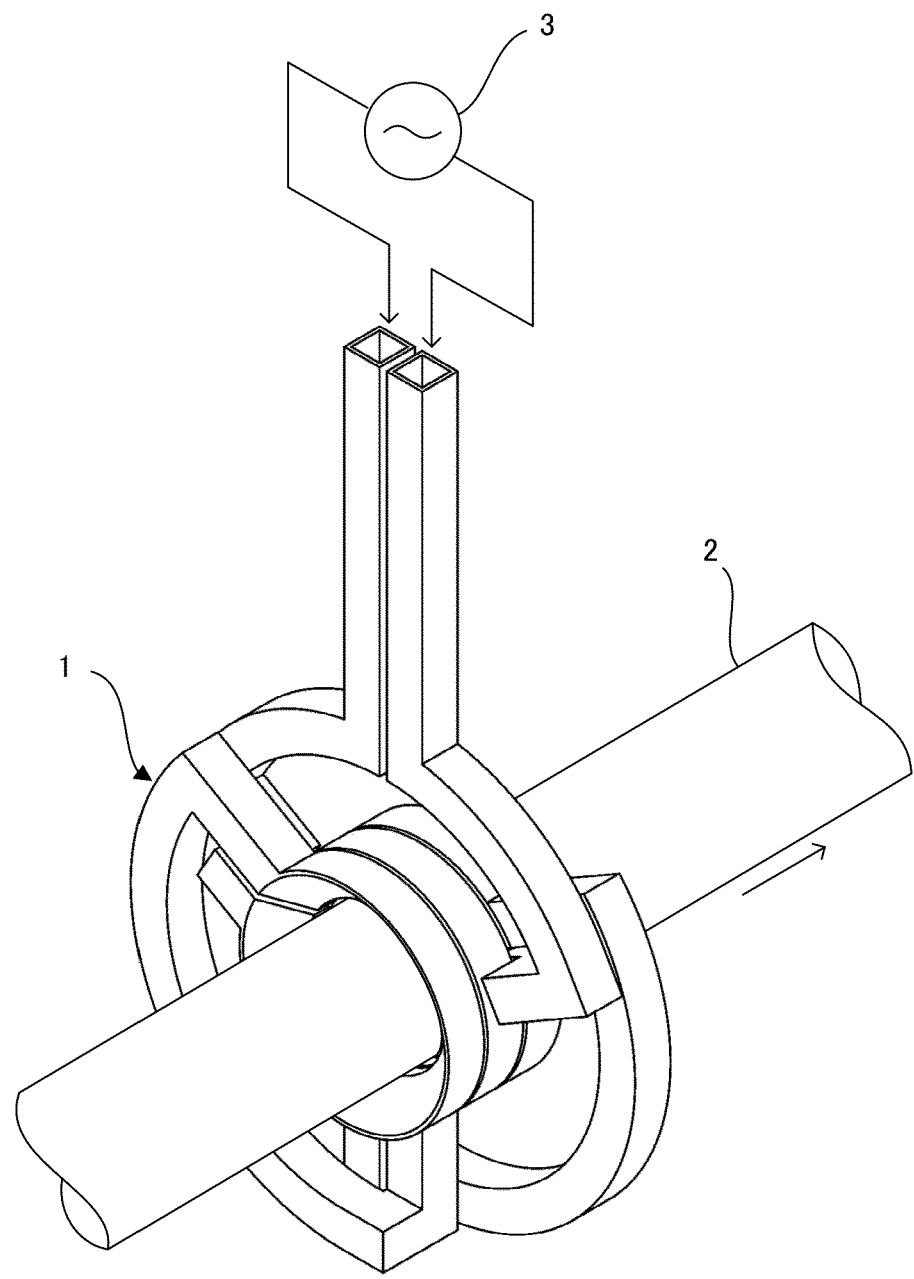

[Fig. 2]
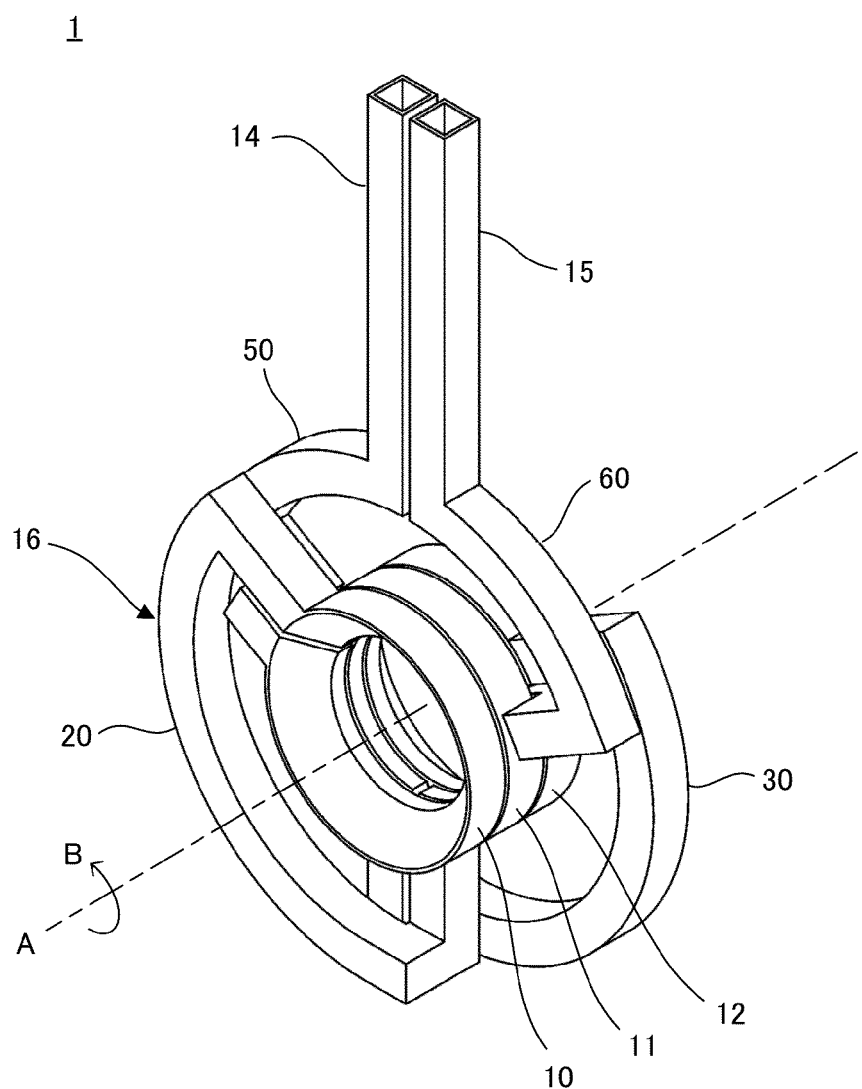

[Fig. 3]
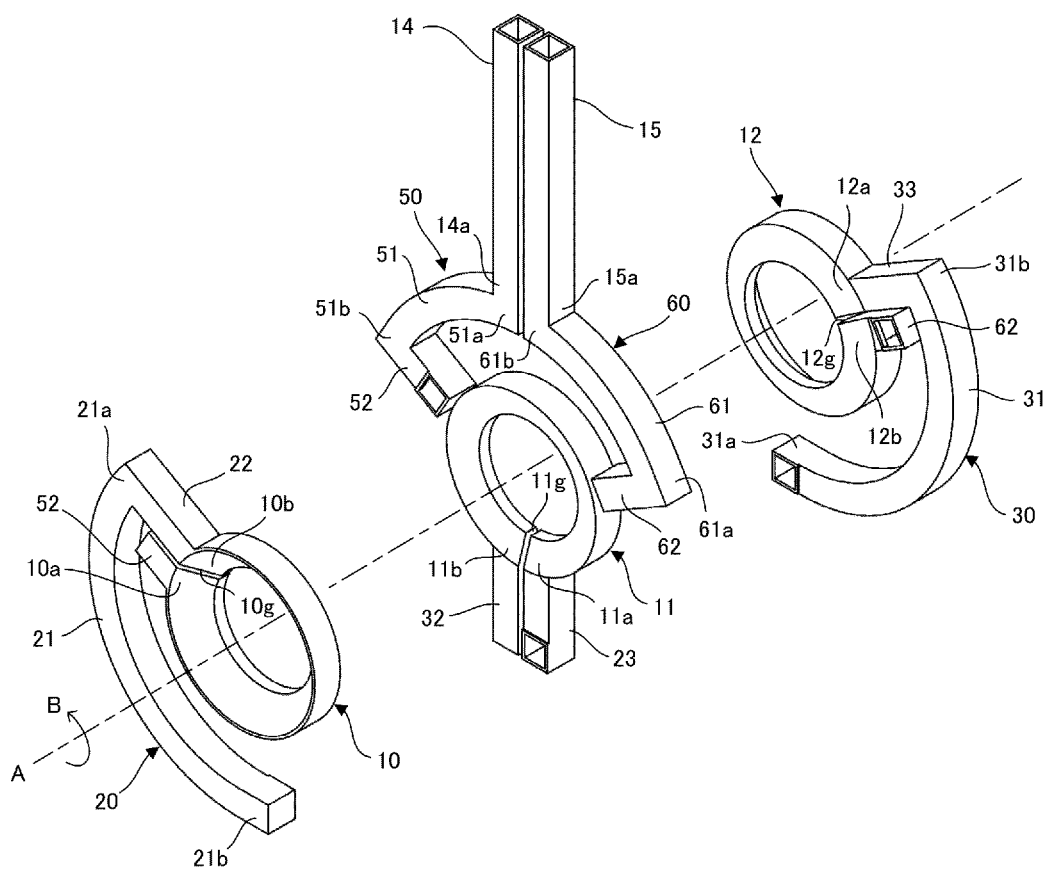

[Fig. 4]
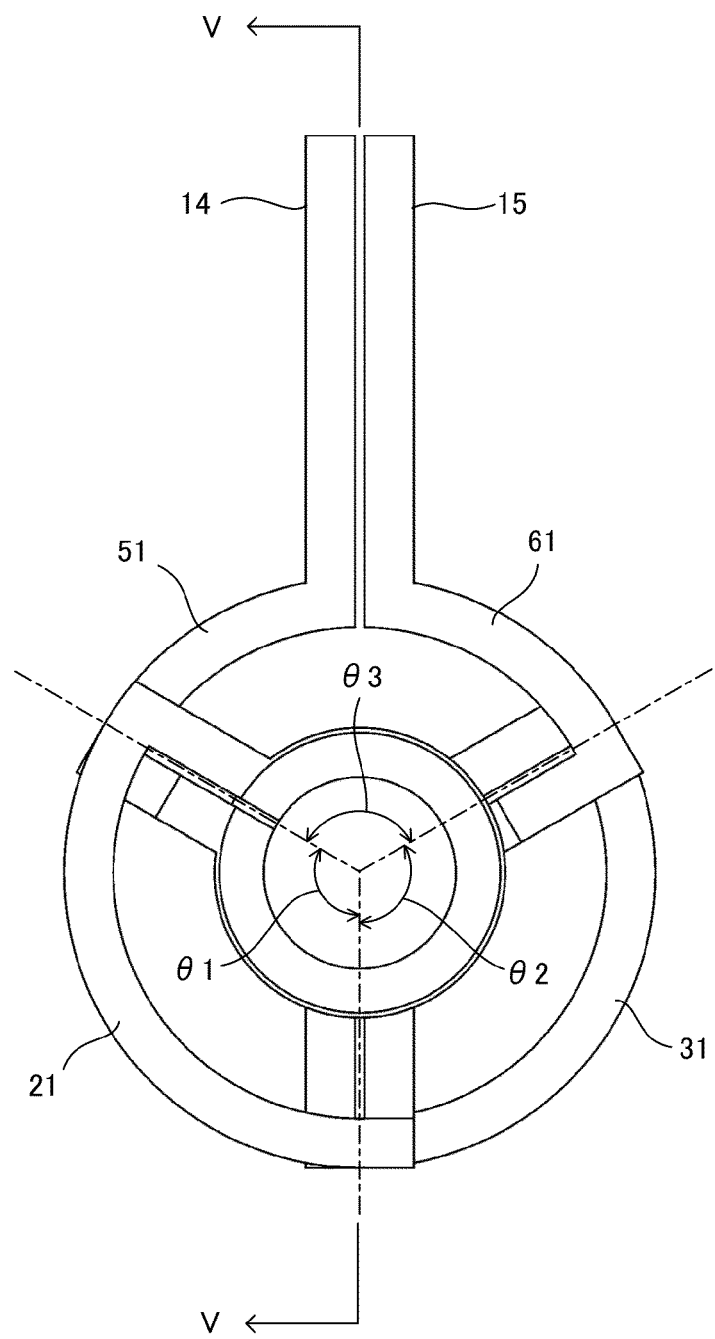

[Fig. 5]
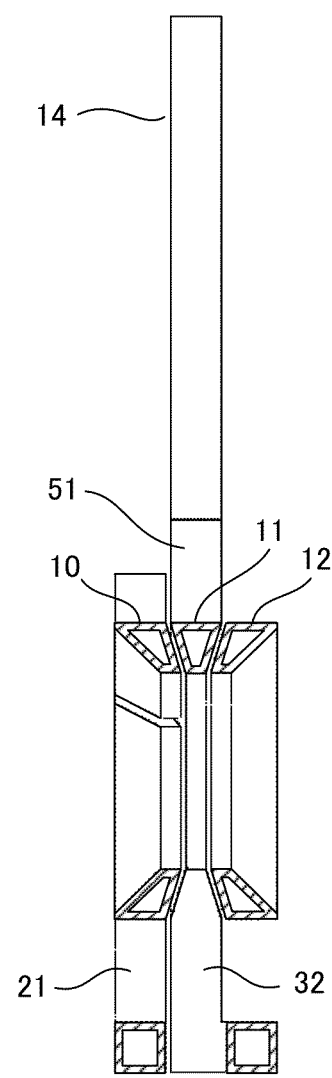

[Fig. 6]
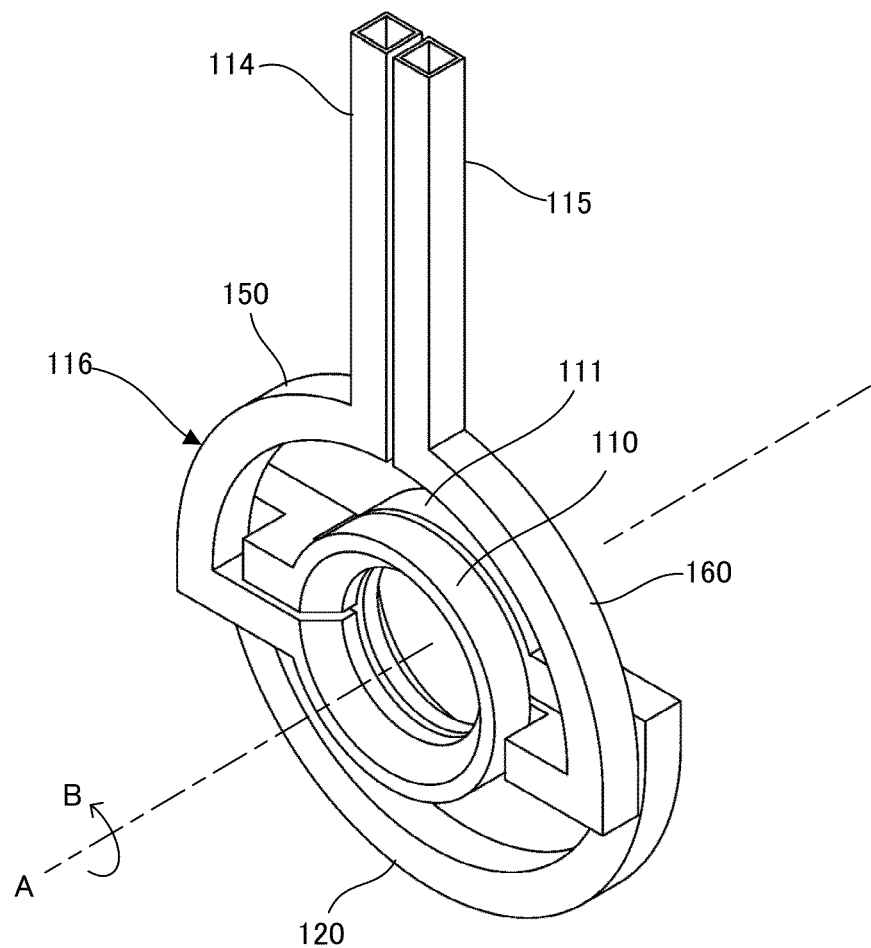

[Fig. 7]
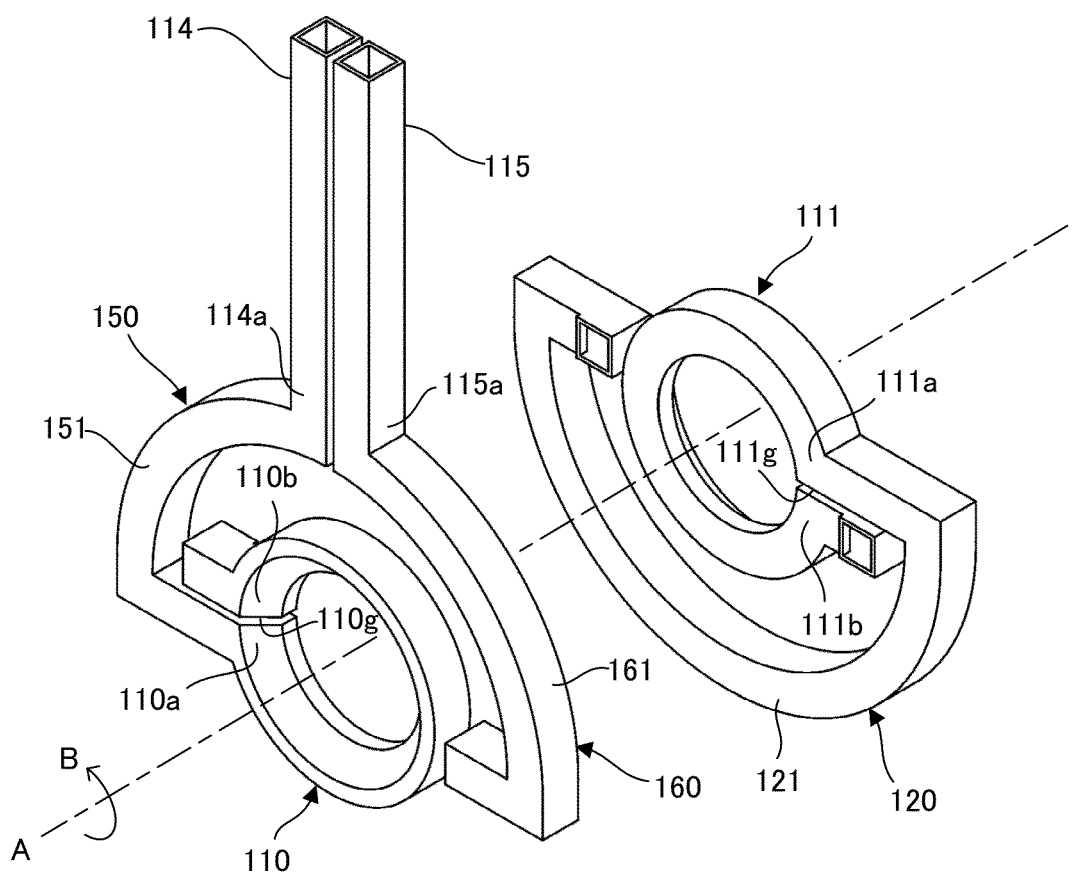

[Fig. 8]
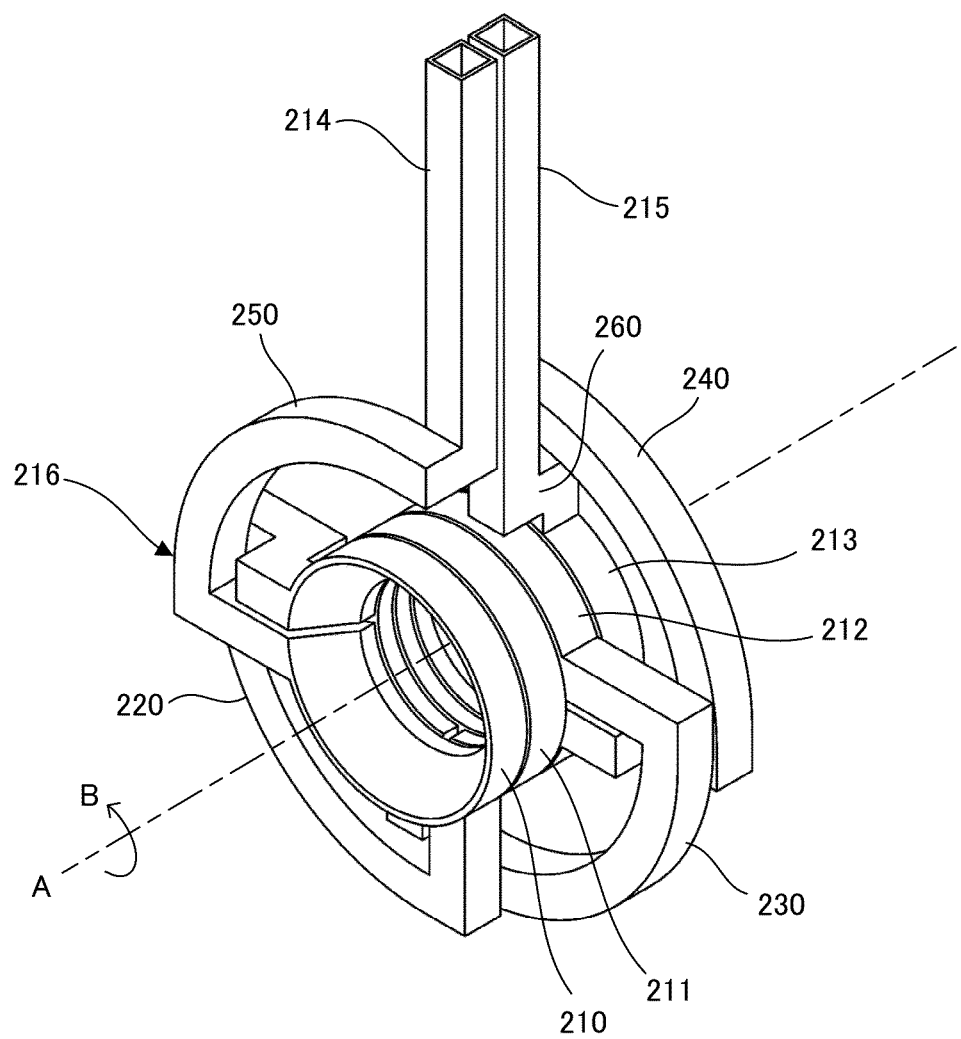

[Fig. 9]
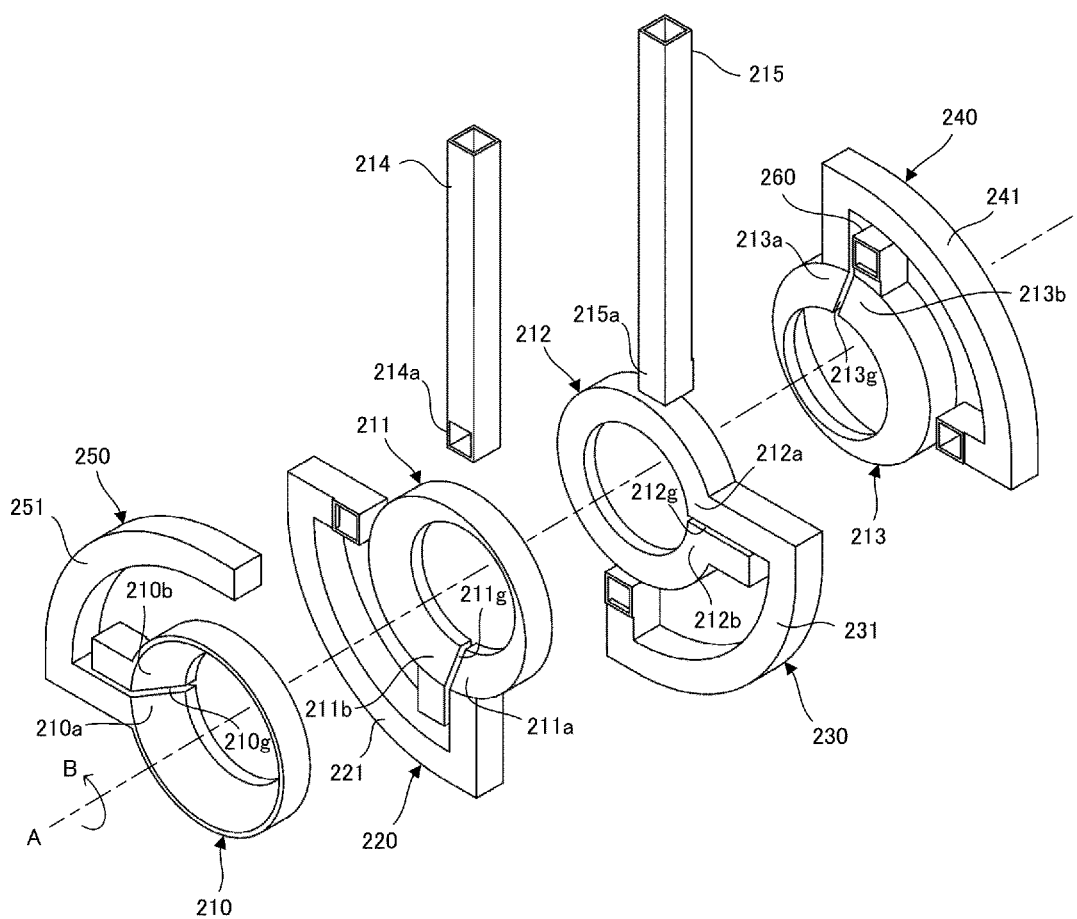

[Fig. 10]
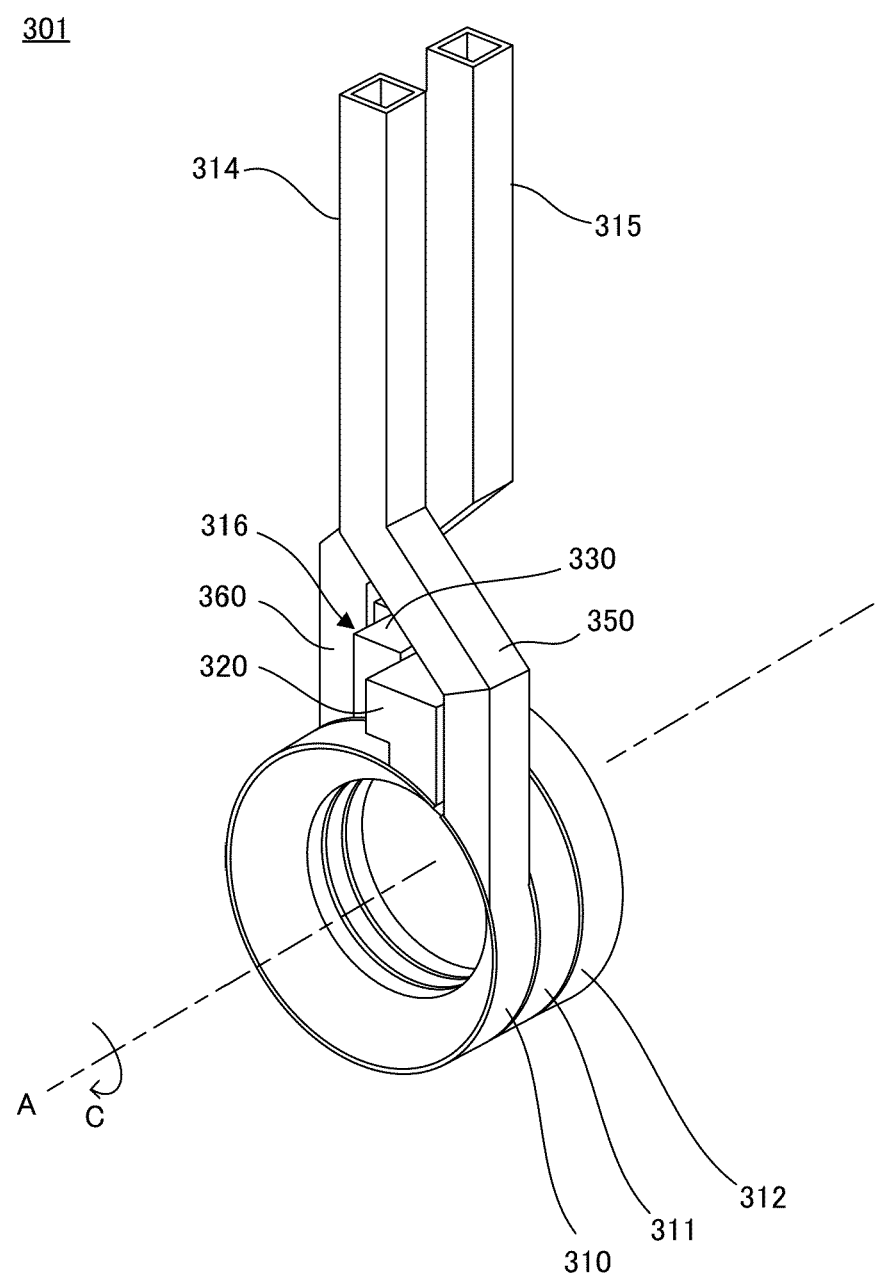

[Fig. 11]
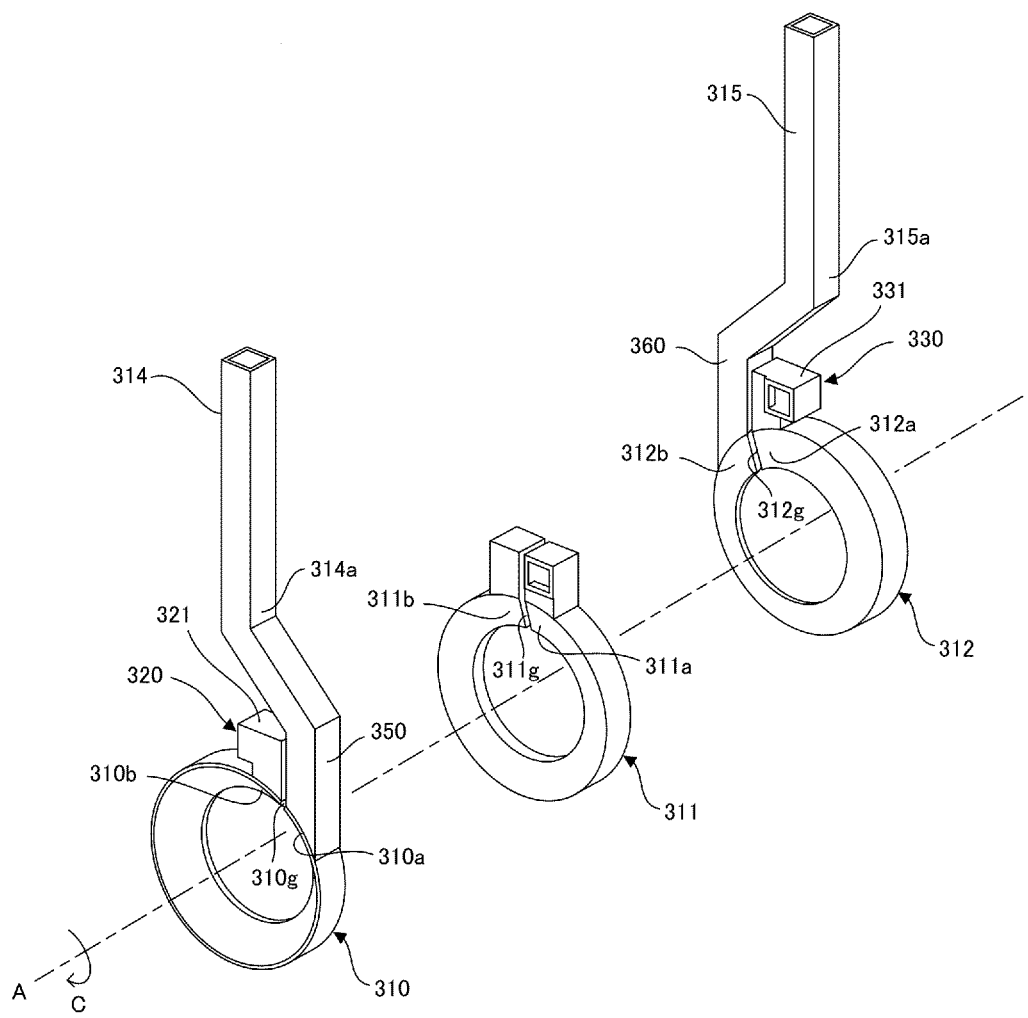

[Fig. 12]
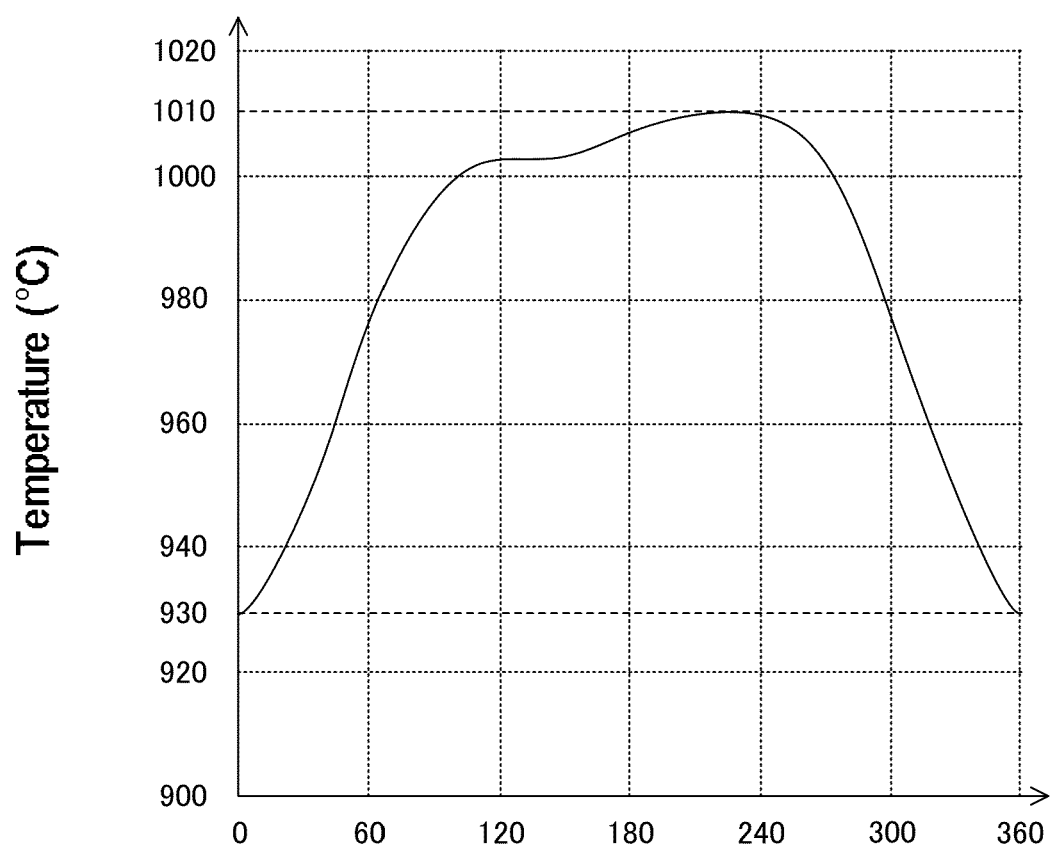

[Fig. 13]
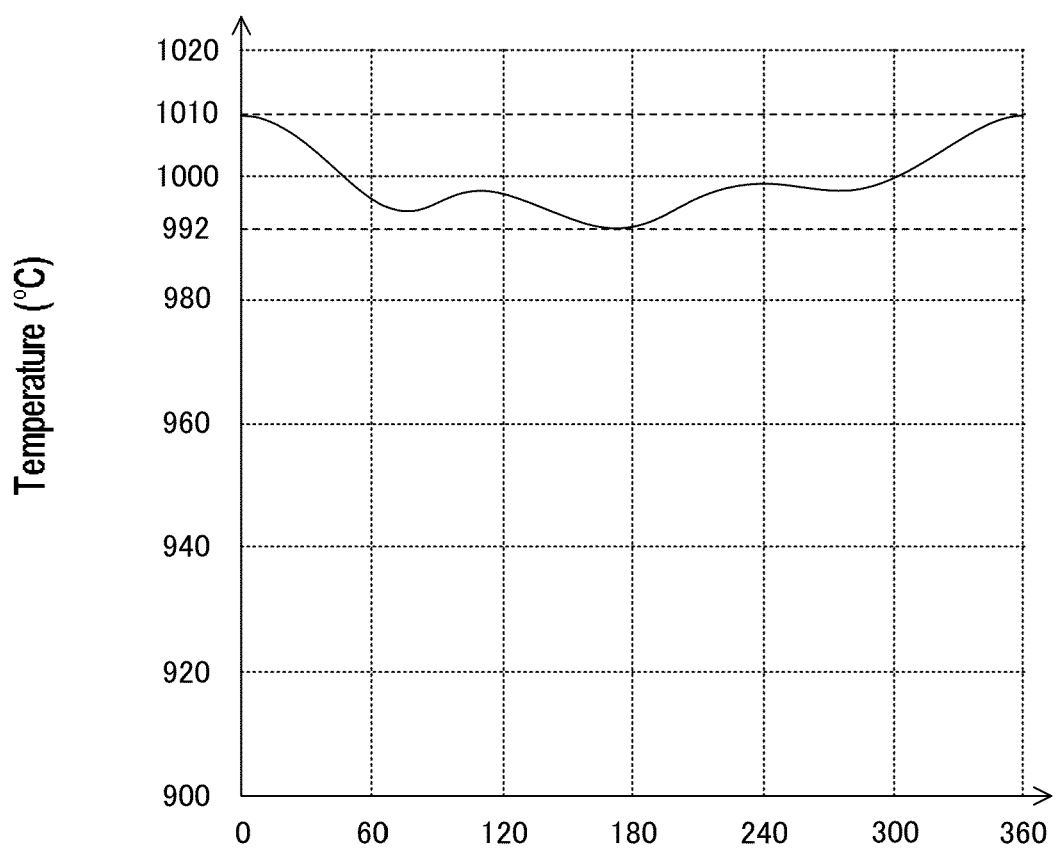

HEATING COIL AND HEATING METHOD

TECHNICAL FIELD

The present invention relates to a heating coil and a heating method.

BACKGROUND ART

Induction heating using an annular heating coil is known as a heating method of a workpiece in a case where a heat treatment such as quenching is performed on an axis-shaped Workpiece. When an alternating current (AC) is supplied to the heating coil through which the workpiece is inserted, a magnetic field is formed around the heating coil, an eddy current is generated in the surface layer of the workpiece interlinking with the magnetic flux inside the heating coil, and the workpiece is inductively heated. When the workpiece is fed in the axial direction in a state where AC power is supplied to the heating coil, the workpiece is continuously heated (see, for example, Patent Document 1).

The heating coil described in Patent Document 1 includes a first one-turn portion and a second one-turn portion, and a lead portion for connecting the first one-turn portion and the second one-turn portion in series. The gap between both end portions of the first one-turn portion and the gap between both end portions of the second one-turn portion are offset in the circumferential direction about the axis. The lead portion is disposed outside the first one-turn portion and the second one-turn portion, and connects one end portion of the first one-turn portion and one end portion of the second one-turn portion.

[Patent Document 1], JP-B-5578465

SUMMARY OF INVENTION

Problem that the Invention is to Solve

For example, in the heating coil described in Patent Document 1, the intensity of the Magnetic field formed in vicinity of the gap of each of the first and second one-turn portions is relatively low. From the viewpoint of uniformly heating the workpiece with respect to such a magnetic field intensity distribution, typically, the workpiece is rotated about the axis, but the workpiece may not be rotated in terms of the device configuration.

In order to uniformly heat the workpiece even when the workpiece cannot be rotated, in the heating coil described in Patent Document 1, a lead intermediate portion extending linearly in the tangential direction of the circumference about the axis is provided in the lead portion, and an interval in the circumferential direction between a gap of the first one-turn portion and a gap of the second is one-turn portion is enlarged. As a result, the first one-turn portion peripherally crosses the gap of the second one-turn portion, and the second one-turn portion peripherally crosses the gap of the first one-turn portion, and the decrease in the magnetic field strength in the vicinity of the gap is compensated.

However, in the heating coil described in Patent Document 1, the lead intermediate portion linearly extends in the tangential direction of the circumference about on the axis. Therefore, the distance between the lead intermediate portion and the first and second one turn portions, in other words, the distance between the lead intermediate portion and the workpiece, changes in the longitudinal direction of the lead intermediate portion, and for example, gradually increases from one end portion toward the other end portion of the lead intermediate portion. Although an alternating current also flows into the lead intermediate portion and a magnetic field is also formed around the lead intermediate portion, the electromagnetic induction decreases as the distance to the workpiece increases, and there is room for improvement from the viewpoint of effectively utilizing a magnetic field formed around the lead intermediate portion.

In the lead intermediate portion spaced apart from the first one-turn portion and the second one-turn portion as the extension is made, the enlargement amount of the interval between the gaps is naturally limited. Therefore, a gap ha an relatively low magnetic field strength is not sufficiently dispersed in the circumferential direction, and there is room for improvement from the viewpoint of uniformly heating the workpiece.

An object of the present invention is to provide a heating coil and a heating method capable of heating a workpiece uniformly and efficiently.

Means for Solving the Problem

In an aspect (1), a heating coil includes a plurality of loop portions disposed coaxially along an axis, a first lead portion and a second lead portion which electrically connect to a power source, and a connection portion which connects the plurality of loop portions, the first lead portion, and the second lead portion in series. The plurality of loop portions includes a first end portion and a second is end portion facing each other with a gap therebetween in a circumferential direction, and rotates from the first end portion toward the second end portion in the circumferential direction about the axis. The gaps of the plurality of loop portions are offset from each other in the circumferential direction about the axis. The connection portion includes a plurality of arc-shaped connection portions extending along an outer peripheral surface of each of the plurality of loop portions. The plurality of arc-shaped connection portions includes one or more inter-loop arc-shaped connection portions, a first lead side arc-shaped connection portion, and/or a second lead side arc-shaped connection portion. The one or more inter-loop arc-shaped connection portions electrically connect a second end portion of a first loop portion and a first end portion of a second loop portion in which the first loop portion and the second loop portion are adjacent, and rotate from the second end portion of the first loop portion toward the first end portion of the second loop portion in the circumferential direction about the axis. A first lead side arc-shaped connection portion electrically connects a first end portion of a loop portion disposed on one end side of a series connection of the plurality of loop portions and the first lead portion, and rotates from the first lead portion toward the first end portion in the circumferential direction about the axis. The second lead side arc-shaped connection portion electrically connects a second end portion of a loop portion disposed on the other end side of a series connection of the plurality of loop portions, and rotates from the second end portion toward the second lead portion in the circumferential direction about the axis.

In an aspect (2) a heating method includes inserting a workpiece into the plurality of loop portions of the heating coil and inductively heating the workpiece by relatively moving the heating coil and the workpiece only in the axial direction in a state in which AC power is supplied to the heating coil.

Advantageous Effect of the Invention

According to the present invention, a heating coil and a heating method capable of heating a workpiece uniformly and efficiently can be provided.

BRIEF DESCRIPTION OF DRAWINGS

FIG. 1 is a perspective view of an example of a heating coil and an example of a workpiece heated by the heating coil for describing an embodiment of the present invention.

FIG. 2 is a perspective view of a single body of the heating coil in FIG. 1

FIG. 3 is an exploded perspective view of the heating coil in FIG. 2.

FIG. 4 is a front view of the heating coil in FIG. 2.

FIG. 5 is a cross-sectional view taken along line V-V of the heating coil in FIG. 2.

FIG. 6 is a perspective view of another example of a heating coil for describing an embodiment of the present invention.

FIG. 7 is an exploded perspective view of the heating coil in FIG. 6.

FIG. 8 is a perspective view of another example of a heating coil for describing an embodiment of the present invention.

FIG. 9 is an exploded perspective view of the heating coil in FIG. 8.

FIG. 10 is a perspective view of a heating coil of a Comparative Example.

FIG. 11 is an exploded perspective view of the heating coil in FIG. 10.

FIG. 12 is a graph showing a heating temperature distribution of a workpiece heated using the heating coil in FIG. 10.

FIG. 13 is a graph showing a heating temperature distribution of a workplace heated using the heating coil in FIG. 2.

MODE FOR CARRYING OUT THE INVENTION

FIG. 1 shows an example Of a heating coil and an example of a workpiece heated by the heating coil for describing an embodiment of the present invention.

A heating coil 1 inductively heats an axis-shaped workpiece 2, and an alternating current is supplied from a power source 3 to the heating coil 1. The workpiece 2 is, for example, a rod or pipe having a circular cross-sectional shape made of a metal material such as steel. The heating coil 1 is formed in an annular shape through which the workpiece 2 can be inserted, and the workpiece 2 is moved only in the axial direction of the workpiece 2 by a is conveying device (not shown). When an alternating current is supplied to the heating coil 1 through which the workpiece 2 is inserted, a magnetic field is formed around the heating coil 1, an eddy current is generated in the surface layer of the workpiece 2 interlinking with the magnetic flux inside the heating coil 1, and the workpiece 2 is inductively heated. When the workpiece 2 is fed in the axial direction in a state where AC power is supplied to the heating coil 1, the workpiece 2 is continuously heated.

FIGS. 2 to 5 show the configuration of the heating coil 1.

As shown in FIGS. 2 and 3, the heating coil 1 includes a first loop portion 10 a second loop portion 11, a third loop portion 12, a first lead portion 14 and a second lead portion 15 for electrically connecting the power source 3, and a connection portion for connecting the first loop portion 10, the second loop portion 11, the third loop portion 12, the first lead portion 14, and the second lead portion 15 in series. The first loop portion 10, the second loop portion 11, the third loop portion 12, the first lead portion 14, the second lead portion 15, and the connection portion 16 are formed of pipes made of a good conductor such as copper, and a continuous flow path through which the cooling medium flows is formed inside thereof. Typically, water is used as the cooling medium.

The first loop portion, 10, the second loop portion 11, and the third loop portion 12 are all formed in an annular shape, and have the sane outer diameter and the same inner diameter. The first loop portion 10 the second loop portion 11, and the third loop portion 12 are coaxially disposed in the order of the first loop portion 10, the second loop portion 11, and the third loop portion 12 along an axis A. The workpiece 2 is inserted into each of the first loop portion 10, the second loop portion 11, and the third loop portion 12.

The first loop portion 10 includes a first end portion 10a and a second end portion 10b facing each other with a gap log in the circumferential direction, and rotates the axis A in a predetermined direction B from the first end portion 10a toward the second end portion 10b. The second loop portion 11 and the third loop portion 12 are also configured similarly to the first loop portion 10. The gap 10g of the first loop portion 10, the gap 11g of the second loop portion 11, and the gap 12g of the third loop portion 12 are offset from each other in the circumferential direction about the axis A, and in the example shown in FIGS. 2 and 3, the gaps are disposed at intervals of 120° about the axis A.

The first lead portion 14 and the second lead portion 45 are disposed outside the first loop portion 10, the second loop portion 11, and the third loop portion 12, and extend parallel to each other in a radial direction about the axis A with an appropriate gap therebetween. The first lead portion 14 and the second lead portion 15 may be integrally joined With an insulating material (not shown) interposed therebetween. In the example shown in FIGS. 2 and 3, a base end portion 14a of the first lead portion 14 and the base end portion 15a of the second lead portion 15 disposed on the axis A side are both disposed on the outer peripheral surface of the second loop portion 11.

The connection portion 16 has a first-second inter-loop connection portion 20 for connecting the second end portion 10b of the first loop portion 10 and a first end portion 11a of the second loop portion 11, a second-third inter-loop connection portion 30 for connecting a second end portion 11b of the second loop portion 11 and a first end portion 12a of the third loop portion 12, a first lead side connection portion 50 for connecting a base end portion 14a of the first lead portion 14 and the first end portion 10a of the first loop portion 10, and a second lead side connection portion 60 for connecting a second end portion 12b of the third loop portion 12 and a base end portion 15a of the second lead portion 15.

The first-second inter-loop connection portion 20 includes a first-second inter-loop arc-shaped connection portion 21. That electrically connects the second end portion 10b of the first loop portion 10 and the first end portion 11a of the second loop portion 11. The first-second inter-loop arc-shaped connection portion 21 is disposed concentrically with the first loop portion 10 and extends along the outer peripheral surface of the first loop portion 10. The first-second inter-loop arc-shaped connection portion 21 rotates the axis A in the predetermined direction B from the second end portion 10b side of the first loop portion 10 toward the first end portion 11a side of the second loop portion 11.

One end portion 21a of the first-second inter-loop arc-shaped connection portion 21 and the second end portion 10b of the first loop portion 10 are connected via an extension portion 22. The extension portion 22 extends linearly in a radial direction about the axis A from the inner peripheral portion of one end portion 21a of the first-second inter-loop arc-shaped connection portion 21 toward the outer peripheral portion of the second end portion 10b of the first loop portion 10. The first-second inter-loop arc-shaped connection portion 21 and the gap 10g of the first loop portion 10 overlap in the radial direction. The other end portion 21b of the first-second inter-loop arc-shaped connection portion 21 and the first end portion 11a of the second loop portion 11 are connected via an extension portion 23. The extension portion 23 extends linearly in the radial direction about the axis A from a side portion on the second loop portion side of the other end portion 21b of the first-second inter-loop arc-shaped connection portion 21 toward the outer peripheral portion of the first end portion 11a of the second loop portion 11.

The second-third inter-loop connection portion 30 includes a second-third inter-loop arc-shaped connection portion 31 that electrically connects the second end portion 11b of the second loop portion 11 and the first end portion 12a of the third loop portion 12. The second-third inter-loop arc-shaped connection portion 31 is disposed concentrically with the third loop portion 12 and extends along an outer peripheral surface of tie third loop portion 12. The second-third inter-loop arc-shaped connection portion 31 rotates the axis A in the predetermined direction B from the second end portion 11b side of the second loop portion 11 toward the first end portion 12a side of the third loop portion 12.

One end portion 31a of the second-third inter-loop arc-shaped connection portion 31 and the second end portion 11b of the second loop portion 11 are connected to each other via an extension portion 32. The extension portion 32 extends linearly in the radial direction about the axis A from a side portion on the second loop portion side of one end portion 31a of the second-third inter-loop arc-shaped connection portion 31 toward the outer peripheral portion of the second end portion 11b of the second loop portion 11. The other end portion 31b of the second-third inter-loop arc-shaped connection portion 31 and the first end portion 12a of the third loop portion 12 are connected to each other via an extension portion 33. The extension portion 33 extends linearly in a radial direction about the axis A from an inner peripheral portion of the other end portion 31b of the second-third inter-loop arc-shaped connection portion 31 toward the outer peripheral portion of the first end portion 12a of the third loop portion 12. The second-third inter-loop arc-shaped connection portion 31 and the gap 12g of the third loop portion 12 overlap in the radial direction.

The first lead side connection portion 50 includes a first lead side arc-shaped connection portion 51 that electrically connects the base end portion 14a of the first lead portion 14 and the first end portion 10a of the first loop portion 10. The first lead side arc-shaped connection portion 51 is disposed concentrically with the second loop portion 11 and extends along the outer peripheral surface of the second loop portion 11. The first lead side arc-shaped connection portion 51 rotates the axis A in the predetermined direction B from the base end portion 14a side of the first lead portion 14 toward the first end portion 10a side of the first loop portion 10.

One end portion 51a of the first lead side arc-shaped connection portion 51 is directly connected to the base end portion 14a of the first lead portion 14. The other end portion 51b of the first lead side arc-shaped connection portion 51 and the first end portion 10a of the first loop portion 10 are connected via an extension portion 52. The extension portion 52 radially extends like a crank about the axis A from an inner peripheral portion of the other end portion 51b of the first lead side arc-shaped connection portion 51 toward the outer peripheral portion of the first end portion 10a of the first loop portion 10, and is inserted between the first loop portion 10 and the first-second inter-loop arc-shaped connection portion 21 and Connected to the first end portion 10a of the first loop portion 10.

The second lead side connection portion 60 includes a second lead side arc-shaped connection portion 61 that electrically connects the base end portion 15a of the second lead portion 15 and the second end portion 12b of the third loop portion 12. The second lead side arc-shaped connection portion 61 is disposed concentrically with the second loop portion 11 and extends along the outer peripheral surface of the second loop portion 11. The second lead side arc-shaped connection portion 61 rotates the axis A in the predetermined direction B from the second end portion 12b side of the third loop portion 12 toward the base end portion 15a side of the second lead portion 15.

One end portion 61a of the second lead side arc-shaped connection portion 61 and the second end portion 12b of the third loop portion 12 are connected via an extension portion 62. The extension portion 62 extends radially like a crank about the axis A from the inner peripheral portion of one end portion 61a of the second lead side arc-shaped connection portion 61 to the outer peripheral portion of the second end portion 12b of the third loop portion 12, and is inserted between the third loop portion 12 and the second-third inter-loop arc-shaped connection portion 31 and connected to the second end portion 12b of the third loop portion 12. The other end portion 61b of the second lead side arc-shaped connection portion 61 is directly connected to the base end portion 15a of the second lead portion 15.

As shown in FIG. 4, in this example in which the gap 10g of the first loop portion 10, the gap 11g of the second loop portion 11, and the gap 12g of the third loop portion 12 are disposed at intervals of 120° about the axis A, an arc center angle θ1 of the first-second inter-loop arc-shaped connection portion 21, an arc center angle θ2 of the second-third inter-loop arc-shaped connection portion 31, and a total arc center angle θ3 of the first lead side arc-shaped connection portion 51 and the second lead side arc-shaped connection portion 61 are 120° respectively, and the total of the arc central angles θ1, θ2 and θ3 is 360°). In other words, when the first-second inter-loop arc-shaped connection portion 21, the second-third inter-loop arc-shaped connection portion 31 the first lead side art-shaped connection portion 51, and the second lead side arc-shaped connection portion 61 are disposed on the same circumference, the arc-shaped connection portions 21, 31, 51, 61 make one turn about the axis A.

As shown in FIG. 4, in this example in which the gap 10g of the first loop portion 10, the gap 11g of the second loop portion 11, and the gap 12g of the third loop portion 12 are disposed at intervals of 240° about the axis A, the arc center angle θ1 of the first-second inter-loop arc-shaped connection portion 21, the arc center angle θ2 of the second-third inter-loop arc-shaped connection portion 31, and the total arc center angle θ3 of the first lead side arc-shaped connection portion 51 and the second lead side arc-shaped connection portion 61 are 240°, respectively, and the arc-shaped connection portions 21, 31, 51, 61 make two turn about the axis A.

As shown in FIG. 5, the width of the inner peripheral surface of the first loop portion 10 is smaller than the width of the outer peripheral surface. Similarly, the width of the inner peripheral surface of the second loop portion 11 is smaller than the width of the outer peripheral surface, and the width of the inner peripheral surface of the third loop portion 12 is smaller than the width of the outer peripheral surface. The alternating current flowing through the first loop portion 10 the second loop portion 11, and the third loop portion 12 flows through an inner peripheral portion that is a shortest path of each loop portion. By making the widths of the inner peripheral surfaces of the first loop portion 10, the second loop portion 11, and the third loop portion 12 relatively small, it is possible to increase the current density while securing the cross-sectional area of the flow path in which the cooling medium flows. By increasing the current density, the strength of the magnetic field formed around the first loop portion 10, the second loop portion 11, and the third loop portion 12 can be increased, and the heating efficiency of the workpiece 2 can be improved.

In the heating coil 1 configured as described above, for example, at the timing at which the alternating current flows from the first end portion 10a toward the second end portion 10b in the first loop portion 10, the alternating current flowing through the first loop portion 10 and the alternating current flowing through the first-second inter-loop arc-shaped connection portion 21 rotates the axis A in the predetermined direction B. Therefore, the magnetic field formed around the first-second inter-loop arc-shaped connection portion 21 enhances the magnetic field formed around the first loop portion 10. The distance between the first-second inter-loop arc-shaped connection portion 21 extending along the outer peripheral surface of the first loop portion 10 and the first loop portion 10, in other words, the distance between the first-second inter-loop arc-shaped connection portion 21 and the workpiece 2, is constant in the longitudinal direction of the first-second inter-loop arc-shaped connection portion 21. Therefore, the magnetic field formed around the first-second inter-loop arc-shaped connection portion 21 is effectively used for inductively heating the workpiece 2 over the entire length of the first-second inter-loop arc-shaped connection portion 21. In particular, the first-second inter-loop arc-shaped connection portion 21 radially overlaps with the gap 10g of the first loop portion 10, and the decrease in the magnetic field strength in the vicinity of the gap 10g is compensated by a magnetic field formed around the first-second inter-loop arc-shaped connection portion 21, so that the heating efficiency of the workpiece 2 is further increased.

Similarly, the magnetic field formed around the second-third inter-loop arc-shaped connection portion 31 extending along the outer peripheral surface of the third loop portion 12 enhances the magnetic field formed around the third loop portion 12, and is effectively used for inductively heating the workpiece 2 over the entire length of the second-third inter-loop arc-shaped connection portion 31. The magnetic field formed around the first lead side arc-shaped connection portion 51 and the second lead side arc-shaped connection portion 61 extending along the outer peripheral surface of the second loop portion 11 enhances the magnetic field formed around the second loop portion 11, and is effectively used for inductively heating the workpiece 2 over the entire lengths of the first lead side arc-shaped connection portion 51 and the second lead side arc-shaped connection portion 61.

The distance between the first-second inter-loop arc-shaped connection portion 21 and the first loop portion 10 is constant regardless of the length of the first-second inter-loop arc-shaped connection portion 21. Similarly, the distance between the second-third inter-loop arc-shaped connection portion 31 and the third loop portion 12 is constant regardless of the length of the second-third inter-loop arc-shaped connection portion 31, the distance between the first lead side arc-shaped connection portion 51 and the second loop part 11 and the distance between the second lead side art-shaped connection portion 61 and the second loop part 11 are constant regardless of the lengths of the first lead side arc-shaped connection portion 51 and the second lead side arc-shaped connection portion 61. Therefore, the degree of freedom in the disposition of the gap 10g of the first loop portion 10, the gap 11g of the second loop portion 11, and the gap 12g of the third loop portion 12 increases, these gaps 10g, 11g, 12g having relatively low magnetic field strength are sufficiently dispersed in the circumferential direction about the axis A, and the heating temperature of the workpiece 2 can be made uniform.

Preferably, as shown in FIG. 4, the sum of the arc center angle θ1 of the first-second inter-loop arc-shaped connection portion 21, the arc center angle θ2 of the second-third inter-loop arc-shaped connection portion 31, and the total arc center angle θ3 of the first lead side arc-shaped connection portion 51 and the second lead side arc-shaped connection portion 61 is 360° or more. Thus, the gap 10g of the first loop portion 10, the gap 11g of the second loop portion 11, and the gap 12g of the third loop portion 12 can be sufficiently dispersed in the circumferential direction about the axis A, and the heating temperature of the workpiece 2 can be made more uniform. Further, preferably, the gap 10g of the first loop portion 10, the gap 11g of the second loop portion 11, and the gap 12g of the third loop portion 12 are disposed at equal angular intervals (120° intervals) about the axis A. Thus, the gap 10g of the first loop portion 10, the gap 11g of the second loop portion 11, and the gap 12g of the third loop portion 12 can be evenly dispersed in the circumferential direction about the axis A, and the heating temperature of the workpiece 2 can be made more uniform.

FIGS. 6 and 7 show another example of the heating coil.

A heating coil 101 shown in FIGS. 6 and 7 includes a first loop portion 110 and a second loop portion 111, a first lead portion 114 and a second lead portion 115 for electrically connecting to a power source, a connection portion 116 for connecting the first loop portion 110, the second loop portion 111, the first lead portion 114, and the second lead portion 115 in series. The first loop portion 110 and the second loop portion 111 are all formed in an annular shape, and have the same outer diameter and the same inner diameter.

The first loop portion 110 has a first end portion 110a and a second end portion 110b facing each other with a gap 110g in the circumferential direction, and rotates the axis A in the predetermined direction B from the first end portion 110 a toward the second end portion 110b. The second loop portion 111 is also configured similarly to the first loop portion 110. The gap 110g of the first loop portion 110 and the gap 111g of the second loop portion 111 are offset from each other in the circumferential direction about the axis A, and in the example shown in FIGS. 6 and 7, the gaps are disposed at intervals of 180° about the axis A.

The first lead portion 114 and the second lead portion 115 are disposed outside the first loop portion 110 and the second loop portion 111, and extend parallel to each other in a radial direction about the axis A with an appropriate gap therebetween. In the example shown in FIGS. 6 and 7, the base end portion 114a of the first lead portion 114 disposed on the axis A side and the base end portion 115a of the second lead portion 115 are both disposed on an outer peripheral surface of the first loop portion 110.

The connection portion 116 includes a first-second inter-loop connection portion 120 for connecting the second end portion 110b of the first loop portion 110 and the first end portion 111a of the second loop portion 111, a first lead side connection portion 150 connecting a base end portion 114a of the first lead portion 114 and the first end portion 110a of the first loop portion 110, and a second lead side connection portion 160 for connecting a second end portion 111b of the second loop portion 111 and a base end portion 115a of the second lead portion 115.

The first-second inter-loop connection portion 120 includes a first-second inter-loop arc-shaped connection portion 121 that electrically connects the second end portion 110b of the first loop portion 110 and the first end portion 111a of the second loop portion 111. The first-second inter-loop arc-shaped connection portion 121 is disposed concentrically with the second loop portion 111 and extends along the outer peripheral surface of the second loop portion 111. The first-second inter-loop arc-shaped connection portion 121 rotates the axis A in the predetermined direction B from the second end portion 110b side of the first loop portion 110 toward the first end portion 111 a side of the Second loop portion 111. The first-second inter-loop arc-shaped connection portion 121 and a gap 111g of the second loop portion 111 overlap in the radial direction.

The first lead side connection portion 150 includes a first lead side arc-shaped connection portion 151 that electrically connects the base end portion 114a of the first lead portion 114 and the first end portion 110a of the first loop portion 110. The first lead side arc-shaped connection portion 151 is disposed concentrically with the first loop portion 110 and extends along the outer peripheral surface of the first loop portion 110. The first lead side arc-shaped connection portion 151 rotates the axis A in the predetermined direction B from the base end portion 114a side of the first lead portion 114 toward the first end portion 110a side of the first loop portion 110. The first lead side arc-shaped connecting part 151 and the gap 110g of the first loop portion 110 overlap in the radial direction.

The second lead side connection portion 160 includes a second lead side arc-shaped connection portion 161 that electrically connects the base end portion 115a of the second lead portion 115 and the second end portion 111b of the second loop portion 111. The second lead side arc-shaped connection portion 161 is disposed concentrically with the first loop portion 110 and extends along the outer peripheral surface of the first loop portion 110. The second lead side arc-shaped connection portion 161 rotates the axis A in the predetermined direction B from the second end portion 111b side of the second loop portion 111 toward the base end portion 115a side of the second lead portion 115.

The magnetic field formed around the first-second inter-loop arc-shaped connection portion 121 extending along the outer peripheral surface of the second loop portion 111 enhances the magnetic field formed around the second loop portion 111 and is effectively used for inductively heating the workpiece 2 over the entire length of the first-second inter-loop arc-shaped connection portion 121. The magnetic field formed around the first lead side arc-shaped connection portion 151 and the second lead side arc-shaped connection portion 161 extending along the outer peripheral surface of the first loop portion 110 enhances the magnetic field formed around the first loop portion 110, and is effectively used for inductively heating the workpiece 2 over the entire lengths of the first lead side arc-shaped connection portion 151 and the second lead side arcuate-shaped connection portion 161.

Then, the distance between the first-second inter-loop arc-shaped connection portion 121 and the second loop portion 111 is constant regardless of the length of the first-second inter-loop arc-shaped connection portion 121, the distance between the first lead side arc-shaped connection portion 151 and the first loop portion 110 and the distance between the second lead side arc-shaped connection portion 161 and the first loop portion 110 are constant regardless of the lengths of the first lead side arc-shaped connection portion 151 and the second lead side arc-shaped connection portion 161. Therefore, the degree of freedom in disposition of the gap 110g of the first loop portion 110 and the gap 111g of the second loop portion 111 is increased, and these gaps 110g, 111g having a relatively low magnetic field strength are sufficiently dispersed in the circumferential direction about the axis A, and the heating temperature of the workpiece 2 can be made uniform.

FIGS. 8 and 9 show another example of the heating coil.

A heating coil 201 illustrated in FIGS. 8 and 9 includes a first loop portion 210, a second loop portion 211, a third loop portion 212, a fourth loop portion 213, a first lead portion 214 and a second lead portion 215 for electrically connecting to a power source, and a connection portion for connecting the first loop portion 210, the second loop portion 211, the third loop portion 212, the fourth loop portion 213, the first lead portion 214, and the second lead portion 215 in series. The first loop portion 210, the second loop portion 211, the third loop portion 212, and the fourth loop portion 213 are all formed in an annular shape, and have the same outer diameter and the same inner diameter.

The first loop portion 210 includes a first end portion 210a and a second end portion 210b facing each other with a gap 210g in the circumferential direction, and rotates the axis A in the predetermined direction B from the first end portion 210a toward the second end portion 210b. The second loop portion 211, the third loop portion 212, and the fourth loop portion 213 are also configured similarly to the first loop portion 210. The gap 210g of the first loop portion 210, the gap 211g of the second loop portion 211, the gap 212g of the third loop portion 212, and the gap 213g of the fourth loop portion 213 are offset from each other in the circumferential direction about the axis A, and in the example shown in FIGS. 8 and 9, are disposed at intervals of 90° about the axis A.

The first lead portion 214 and the second lead portion 215 are disposed outside the first loop portion 210, the second loop portion 211, the third loop portion 212, and the fourth loop portion 213, and extend parallel to each other in a radial direction about the axis A with an appropriate gap therebetween. In the example shown in FIGS. 8 and 9, a base end portion 214a of the first lead portion 214 disposed on the axis A side is disposed on the outer peripheral surface of the second loop portion 211, and a base end portion 215a of the second lead portion 215 is disposed on the outer peripheral surface of the third loop portion 212.

The connection portion 216 includes a first-second inter-loop connection portion 220 for connecting a second end portion 210b of the first loop portion 210 and a first end portion 212a of the second loop portion 211, a second-third inter-loop connection portion 230 for connecting a second end portion 211b of the second loop portion and a first end portion 212a of the third loop portion 212, a third-fourth inter-loop connection portion 240 for connecting a second end portion 212b of the third loop portion 212 and a first end portion 213a of the fourth loop portion 213, a first lead side connection portion 250 for connecting a base end portion 214a of the first lead portion 214 and the first end portion 210a of the first loop portion 210, and a second lead side connection portion 260 for connecting a second end portion 213b of the fourth loop portion 213 and the base end portion 215a of the second lead portion 215.

The first-second inter-loop connection portion 220 includes a first-second inter-loop arc-shaped connection portion 221 that electrically connects the second end portion 210b of the first loop portion 210 and the first end portion 211a of the second loop portion 211. The first-second inter-loop arc-shaped connection portion 221 is disposed concentrically with the second loop portion 211 and extends along the outer peripheral surface of the second loop portion 211. The first-second inter-loop arc-shaped connection portion 221 rotates the axis A in the predetermined direction B from the second end portion 210b side of the first loop portion 210 toward the first end portion 211a side of the second loop portion 211. The first-second inter-loop arc-shaped connection portion 221 and the gap 211g of the second loop portion 211 overlap in the radial direction.

The second-third inter-loop connection portion 230 includes a second-third inter-loop arc-shaped connection portion 231 that electrically connects the second end portion 211b of the second loop portion 211 and the first end portion 212a of the third loop portion 212. The second-third inter-loop arc-shaped connection portion 231 is disposed concentrically with the third loop portion 212 and extends along the outer peripheral surface of the third loop portion 212. The second-third inter-loop arc-shaped connection portion 231 rotates the axis A in the predetermined direction B from the second end portion 211b side of the second loop portion 211 toward the first end portion 212a side of the third loop portion 212. The second-third inter-loop arc-shaped connection portion 231 and the gap 212g of the third loop portion 212 overlap in the radial direction.

The third-fourth inter-loop connection portion 240 includes a third-fourth inter-loop arc-shaped connection portion 241 that electrically connects the second end portion 212b of the third loop portion 212 and the first end portion 213a of the fourth loop portion 213. The third-fourth inter-loop arc-shaped connection portion 241 is disposed concentrically with the fourth loop portion 213 and extends along the outer peripheral surface of the fourth loop portion 213. The third-fourth inter-loop arc-shaped connection portion 241 rotates the axis A in the predetermined direction B from the second end portion 212b side of the third loop portion 212 toward the first end portion 213a side of the fourth loop portion 213. The third-fourth inter-loop arc-shaped connection portion 241 and the gap 213g of the fourth loop portion 213 overlap in the radial direction.

The first lead side connection portion 250 includes a first lead side arc-shaped connection portion 251 that electrically connects the base end portion 214a of the first lead portion 214 and the first end portion 210a of the first loop portion 210. The first lead side arc-shaped connection portion 251 is disposed concentrically with the first loop portion 210 and extends along the outer peripheral surface of the first loop portion 210. The first lead side arc-shaped connection portion 251 rotates the axis A in the predetermined direction B from the base end portion 214a side of the first lead portion 214 toward the first end portion 210a side of the first loop portion 210. The first lead side arc-shaped connection portion 251 and the gap 210g of the first loop portion 210 overlap in the radial direction.

The magnetic field formed around the first-second inter-loop arc-shaped connection portion 221 extending along the outer peripheral surface of the second loop portion 211 enhances the magnetic field formed around the second loop portion 211, and is effectively used for inductively heating the workpiece 2 over the entire length of the first-second inter-loop arc-shaped connection portion 221. The magnetic field formed around the second-third inter-loop arc-shaped connection portion 231 extending along the outer peripheral surface of the third loop portion 212 enhances the magnetic field formed around the third loop portion 212, and is effectively used for inductively heating the workpiece 2 over the entire length of the second-third inter-loop arc-shaped connection portion 231. The magnetic field formed around the third-fourth inter-loop arc-shaped connection portion 241 extending along the outer peripheral surface of the fourth loop portion 213 enhances the magnetic field formed around the fourth loop portion 213, and is effectively used for inductively heating the workpiece 2 over the entire length of the third-fourth inter-loop arc-shaped connection portion 241. The magnetic field formed around the first lead side arc-shaped connection portion 251 extending along the outer peripheral surface of the first loop portion 210 enhances the magnetic field formed around the first loop portion 210, and is effectively used for inductively heating the workpiece 2 over the entire length of the first lead side arc-shaped connection portion 251.

Then, the distance between the first-second inter-loop arc-shaped connection portion 221 and the second loop portion 211 is constant regardless of the length of the first-second inter-loop arc-shaped connection portion 221, the distance between the second-third inter-loop arc-shaped connection portion 231 and the third loop part 212 is constant regardless of the length of the second-third inter-loop arc-shaped connection portion 231, the distance between the third-fourth inter-loop arc-shaped connection portion 241 and the fourth loop portion 213 is constant regardless of the length of the third-fourth inter-loop arc-shaped connection portion 241, and the distance between the first lead side arc-shaped connection portion 251 and the first loop part 210 s constant regardless of the length of the first lead side arc-shaped connection portion 251. Therefore, the degree of freedom in disposition of the gap 210g of the first loop portion 210, the gap 211g of the second loop portion 211, the gap 212g of the third loop portion 212, and the gap 213g of the fourth loop portion 213 is increased, and theses gaps 210g, 211g, 212g, 213g having a relatively low magnetic field strength are sufficiently dispersed in the circumferential direction about the axis A, the heating temperature of the workpiece 2 can be made uniform.

Although the heating coil having two to four loop portions has been described so far, five or more loop portions may be provided.

Examples and Comparative Examples will be described below.

EXAMPLE

A pipe member made of S45C and having an outer diameter of 35 mm and a thickness of 2 mm was used as a workpiece, when the workpiece was inductively heated by using the heating coil 1 shown in FIGS. 2 and 3 while moving at a moving speed of 150 mm/sec only in the axial direction, the heating temperature distribution in the circumferential direction of the workpiece was obtained by simulation. The frequency of the AC current supplied to the heating coil 1 was set to 10 kHz, and the target heating temperature of the workpiece was set to 1000° C. The inner diameters of the first loop portion 10, the second loop portion 11, and the intervals of the third loop portion 12 are 39 mm, and the gap 10g of the first loop portion 10, the gap 11g of the second loop portion 11, and the gap 12g of the third loop portion 12 are 120°.

COMPARATIVE EXAMPLE

When the same workpiece as in Example was inductively heated by using the heating coil 301 shown in FIGS. 10 and 11 while moving at a moving speed of 150 mm/sec only in the axial direction as in Example, the heating temperature distribution in the circumferential direction of the workpiece was obtained by simulation. The frequency of the AC current supplied to the heating coil 301 was set to 10 kHz, and the target heating temperature of the workpiece was set to 1000° C. The heating coil 301 in Comparative Example will be described below.

The heating coil 351 shown, in FIGS. 10 and 11 includes a first loop portion 310, a second loop portion 311, a third loop portion 312, a first lead portion 314 and a second lead portion 315 for electrically connecting to a power source, a connection portion 316 for connecting the first loop portion 310, the second loop portion 311, the third loop portion 312, the first lead portion 314, and the second lead portion 315 in series. The first loop portion 310, the second loop portion 311, and the third loop portion 312 are all formed in an annular shape, and have the same outer diameter and the same inner diameter.

The first loop portion 310 includes a first end portion 310a and a second end portion 310b facing each other with a gap 310g in the circumferential direction, and rotates the axis A in the predetermined direction C from the first end portion 310a toward the second end portion 310b. The second loop portion 311 and the third loop portion 312 are also configured similarly to the first loop portion 310. The gap 310g of the first loop portion 310, the gap 311g of the second loop portion 311, and the gap 312g of the third loop portion 312 are offset from each other in the circumferential direction about the axis A.

The connection portion 316 includes a first-second inter-loop connection portion 320 for connecting the second end portion of the first loop portion 310 and the first end portion 311a of the second loop portion, a second-third inter-loop connection portion 330 for connecting the second end portion 311b of the second loop portion 311 and the first end portion 312a of the third loop portion 312, a first lead side connection portion 350 for connecting a base end portion 314a of the first lead portion 314 and the first end portion 310a of the first loop portion 310, and a second lead side connection portion 350 for connecting the second end portion 312b of the third loop portion 312 and the base end portion 315a of the second lead portion 315.

The first-second inter-loop connection portion 320 includes an intermediate portion 321 that is outside the first loop portion 310 and extends linearly in a tangential direction of the circumference about the axis A. The second-third inter-loop connection portion 330 includes an intermediate portion 331 that is outside the third loop portion 312 and extends linearly in the tangential direction of the circumference about the axis A.

In the heating coil 301 configured as described above, the inner diameters of the first loop portion 310, the second loop portion 311, and the third loop portion 312 are 39 mm, and the intervals of the gap 310g of the first loop portion 310, the gap 311g of the second loop portion 311, and the gap 12g of the third loop portion 312 are 35°.

FIG. 12 shows a simulation result of the heating temperature distribution of the workpiece in Comparative Example, and FIG. 13 shows a simulation result of the heating temperature distribution of the workpiece in Example. In FIGS. 12 and 13, the horizontal axis indicates the peripheral position of each portion of the workpiece by the rotation angle (°) about the central axis, and the point that overlaps the gap between the first lead portion and the second lead portion in the radial direction is set as the origin.

As shown in FIG. 12, in Comparative Example, the maximum value of the temperature difference of each portion of the workpiece was 80° C. (maximum temperature: 1010° C., minimum temperature: 930° C.), and the electric power supplied to the heating coil 301 was 149 kW in order to obtain the heating temperature distribution. In the heating coil 301 in Comparative Example, it can be seen that the gap 310g of the first loop portion 310, the gap 311g of the second loop portion 311, and the gap 312g of the third loop portion 312 are disposed at intervals of 35°, and heating of the workpiece is insufficient in the vicinity of the origin where these gaps 310g, 311g, and 312g gather.

On the other hand, as shown in FIG. 13, in Example, the maximum value of the temperature difference of each portion of the workpiece was 18° C. (maximum temperature: 1010° C., minimum temperature: 992° C.), and the electric power supplied to the heating coil 301 was 153 kW in order to obtain the heating temperature distribution. In the heating coil 1 in Example, it can be seen that the gap 10g of the first loop portion 10, the gap 11g of the second loop portion 11, and the gap 12g of the third loop portion 12 are disposed at intervals of 120°, and the heating temperature of the workpiece is un form by sufficiently dispersing these gaps 10g, 11g, and 12g in the circumferential direction. Further, it can be seen that the electric power supplied to the heating coil is substantially the same between Example and Comparative Example, magnetic fields formed around the plurality of arc-shaped connection portions 21, 31, 51, 61 extending along the outer peripheral surfaces of the plurality of loop portions 10, 11, 12 are effectively used for heating the workpiece, thus the heating efficiency of the workpiece is improved.

As described above, the heating coil disclosed in the description includes: the plurality of loop portions disposed coaxially along an axis; the first lead portion and the second lead portion which electrically connect to the power source; and a connection portion for connecting the plurality of loop portions, the first lead portion, and the second lead portion in series, in which the plurality of loop portions include a first end portion and a second end portion facing each other with a gap therebetween in a circumferential direction, and rotate the axis in a predetermined direction from the first end portion toward the second end portion, the gaps of the plurality of loop portions are offset from each other in the circumferential direction about the axis, the connection portion includes a plurality of arc-shaped connection portions extending along an outer peripheral surface of each of the plurality of loop portions, and the plurality of arc-shaped connection portions include: one or more inter-loop arc-shaped connection portions that electrically connect a second end portion of one of two adjacent loop portions and a first end portion of the other loop portion, and rotate the axis in the predetermined direction from the second end portion toward the first end portion; a first lead side arc-shaped connection portion which electrically connects a first end portion of a loop portion disposed on one end side of a series connection of the plurality of loop portions and the first lead portion, and rotates the axis in the predetermined direction from the first lead portion toward the first end portion; and/or a second lead side arc-shaped connection portion which electrically connects a second end portion of a loop portion disposed on the other end side of a series connection of the plurality of loop portions, and rotates the axis in the predetermined direction from the second end portion toward the second lead portion.

In the heating coil disclosed in the description, the sum of the arc center angles of the plurality of arc-shaped connection portions is 360° or more.

In the heating coil disclosed in the present specification, the gaps of the plurality of loop portions are disposed at equal angular intervals about the axis.

In the heating coil disclosed in the description, the gap of at least one of the plurality of loop portions and the arc-shaped connection portion disposed along the outer peripheral surface of the loop portion overlap in the radial direction.

In the heating coil disclosed in the description, the width of the inner peripheral surface of each of the plurality of loop portions is smaller than the width of the outer peripheral surface.

In the heating method disclosed in the description, the workpiece is inductively heated by relatively moving the heating coil and the workpiece only in the axial direction in a state in which the workpiece is inserted into the plurality of loop portions of the heating coil and AC power is supplied to the heating coil.

This application claims priority to Japanese Patent Application No. 2018-15667 filed on Aug. 23, 2018, the entire content of which is incorporated herein by reference.

The invention claimed is:

1. A heating coil comprising:
a plurality of loop portions disposed coaxially along an axis;
a first lead portion and a second lead portion which electrically connect to a power source; and
a connection portion which connects the plurality of loop portions, the first lead portion, and the second lead portion in series,
wherein each of the plurality of loop portions includes a first end portion and a second end portion facing each other with a gap therebetween in a circumferential direction, and extends from the first end portion toward the second end portion in the circumferential direction about the axis,
wherein the gaps of the plurality of loop portions are offset from each other in the circumferential direction about the axis,
wherein the connection portion includes a plurality of arc-shaped connection portions each extending along and spaced away from an outer peripheral surface of one of the plurality of loop portions,
wherein the plurality of arc-shaped connection portions includes one or more inter-loop arc-shaped connection portions, a first lead side arc-shaped connection portion, and/or a second lead side arc-shaped connection portion,
wherein the one or more inter-loop arc-shaped connection portions electrically connect a second end portion of a first loop portion of the plurality of loop portions and a first end portion of a second loop portion of the plurality of loop portions in which the first loop portion and the second loop portion are adjacent, and extend from the second end portion of the first loop portion toward the first end portion of the second loop portion in the circumferential direction about the axis,
wherein the first lead side arc-shaped connection portion electrically connects a first end portion of a loop portion of the plurality of loop portions, which is disposed on one end side of a series connection of the plurality of loop portions, to the first lead portion, and extends from the first lead portion toward the first end portion of the loop portion in the circumferential direction about the axis, and
wherein the second lead side arc-shaped connection portion electrically connects a second end portion of another loop portion of the plurality of loop portions, which is disposed on another end side of the series connection of the plurality of loop portions, to the second lead portion, and extends from the second end portion toward the second lead portion in the circumferential direction about the axis.

2. The heating coil according to claim 1,
wherein a sum of arc center angles of the plurality of arc-shaped connection portions is 360° or more.

3. The heating coil according to claim 1,
wherein the gaps of the plurality of loop portions are disposed at equal angular intervals about the axis such that there is equal space between the gaps in the circumferential direction.

4. The heating coil according to claim 1,
wherein the gap of at least one loop portion of the plurality of loop portions and one of the arc-shaped connection portions disposed along the outer peripheral surface of the loop portion overlap in the radial direction.

5. The heating coil according to claim 1,
wherein a width of an inner peripheral surface of each of the plurality of loop portions is smaller than a width of the outer peripheral surface.

6. A heating method, comprising:
inserting a workpiece into the plurality of loop portions of the heating coil according to claim 1; and
inductively heating the workpiece by relatively moving the heating coil and the workpiece only in the axial direction in a state in which AC power is supplied to the heating coil.

* * * * *